(12) United States Patent
Uhl et al.

(10) Patent No.: US 7,493,277 B1
(45) Date of Patent: Feb. 17, 2009

(54) BUSINESS OPPORTUNITY ANALYTICS WITH DEPENDENCE

(75) Inventors: Stephen Uhl, Marblehead, MA (US); Clint Korver, Mountain View, CA (US); John Amos, Davis, CA (US)

(73) Assignee: MyDecide Inc., Mountain View, CA (US)

( * ) Notice: Subject to any disclaimer, the term of this patent is extended or adjusted under 35 U.S.C. 154(b) by 1132 days.

(21) Appl. No.: 10/224,379

(22) Filed: Aug. 21, 2002

(51) Int. Cl.
*G06Q 40/00* (2006.01)
*G06F 17/30* (2006.01)
*G07G 1/00* (2006.01)
*G06F 19/00* (2006.01)

(52) U.S. Cl. .............................. 705/36; 705/10; 705/37; 700/93

(58) Field of Classification Search .................... 705/36, 705/10, 37; 700/93
See application file for complete search history.

(56) References Cited

U.S. PATENT DOCUMENTS

| | | | |
|---|---|---|---|
| 4,829,426 A | 5/1989 | Burt ........................... | 364/300 |
| 5,063,522 A | 11/1991 | Winters ........................ | 395/51 |
| 5,167,011 A | 11/1992 | Priest ........................... | 395/54 |
| 5,182,793 A | 1/1993 | Alexander et al. ............ | 395/13 |
| 5,689,652 A | 11/1997 | Lupien et al. ................ | 395/237 |
| 5,758,328 A | 5/1998 | Giovannoli ................... | 705/26 |
| 5,842,193 A | 11/1998 | Reilly .......................... | 706/45 |
| 5,953,707 A | 9/1999 | Huang et al. .................. | 705/10 |
| 5,963,923 A | 10/1999 | Garber ......................... | 705/37 |
| 5,970,252 A | 10/1999 | Boxton et al. ................ | 395/54 |
| 5,974,256 A | 10/1999 | Matthews et al. ............ | 395/705 |
| 5,974,441 A | 10/1999 | Rogers et al. ................ | 709/200 |
| 5,987,425 A | 11/1999 | Hartman et al. ............... | 705/20 |
| 6,012,051 A | 1/2000 | Sammon, Jr. et al. ......... | 706/52 |
| 6,220,743 B1 | 4/2001 | Campestre et al. ..... | 364/468.03 |
| 6,260,024 B1 | 7/2001 | Shkedy ........................ | 705/37 |
| 6,263,352 B1 | 7/2001 | Cohen .......................... | 707/513 |
| 6,298,328 B1 | 10/2001 | Healy et al. ................... | 705/10 |
| 6,493,679 B1 | 12/2002 | Rappaport et al. ............ | 705/29 |
| 6,655,963 B1 | 12/2003 | Horvitz et al. ............... | 434/236 |
| 6,714,937 B1 | 3/2004 | Eynon et al. ................. | 707/102 |
| 6,735,596 B2 | 5/2004 | Corynen ...................... | 707/102 |

(Continued)

FOREIGN PATENT DOCUMENTS

JP     2001-134635     5/2001

(Continued)

OTHER PUBLICATIONS

Peter Leeflang and Dick Wittink, Past, present and future, International Journal of Research in Marketing, Sep. 2000.*

(Continued)

*Primary Examiner*—James P. Trammell
*Assistant Examiner*—Scott S. Trotter
(74) *Attorney, Agent, or Firm*—Pillsbury Winthrop Shaw Pittman LLP

(57) ABSTRACT

A system and method are provided to analyze the value of an opportunity, including the dependence and interrelationship between opportunities. A computer-implemented system having a number of software modules is provided that facilitates the calculation of portfolio effects and enables, among other things, the modeling of opportunities, including generic nomenclature and procedures for describing and encoding a wide range of relationships between opportunities.

17 Claims, 8 Drawing Sheets

Constraint-Type Portfolio Effect

An action or element of Opportunity A affects the value of other Opportunities.

U.S. PATENT DOCUMENTS

| | | | |
|---|---|---|---|
| 6,751,597 B1 | 6/2004 | Brodsky et al. | 705/37 |
| 6,801,199 B1 | 10/2004 | Wallman | 345/440 |
| 6,963,854 B1 * | 11/2005 | Boyd et al. | 705/37 |
| 6,968,538 B2 | 11/2005 | Rust et al. | 717/108 |
| 6,980,966 B1 | 12/2005 | Sobrado et al. | 705/26 |
| 6,996,539 B1 | 2/2006 | Wallman | 705/36 |
| 7,035,772 B2 | 4/2006 | Etgen | 702/187 |
| 7,076,534 B1 | 7/2006 | Cleron et al. | 709/219 |
| 7,080,371 B1 | 7/2006 | Arnaiz et al. | 717/170 |
| 2001/0013009 A1 | 8/2001 | Greening et al. | 705/10 |
| 2001/0014868 A1 | 8/2001 | Herz et al. | 705/14 |
| 2001/0039508 A1 | 11/2001 | Nagler et al. | 705/11 |
| 2001/0047322 A1 | 11/2001 | Plate et al. | 705/37 |
| 2002/0016759 A1 | 2/2002 | Macready et al. | 705/37 |
| 2002/0019761 A1 | 2/2002 | Lidow | 705/10 |
| 2002/0038265 A1 | 3/2002 | Mertz et al. | 705/28 |
| 2002/0046125 A1 | 4/2002 | Speicher et al. | 705/22 |
| 2002/0111922 A1 | 8/2002 | Young et al. | 705/80 |
| 2002/0174049 A1 | 11/2002 | Kitahara | 705/36 |
| 2002/0188488 A1 * | 12/2002 | Hinkle | 705/8 |
| 2003/0036943 A1 | 2/2003 | Grant | 705/10 |
| 2003/0167265 A1 | 9/2003 | Corynen | 707/4 |
| 2004/0015382 A1 | 1/2004 | Baca et al. | 705/8 |
| 2004/0088239 A1 | 5/2004 | Eder | 705/36 |
| 2005/0096950 A1 | 5/2005 | Caplan et al. | 705/7 |
| 2005/0261987 A1 | 11/2005 | Bezos et al. | 705/27 |
| 2007/0124227 A1 | 5/2007 | Dembo et al. | 705/36 |

FOREIGN PATENT DOCUMENTS

| | | |
|---|---|---|
| WO | WO 00/51051 | 8/2000 |

OTHER PUBLICATIONS

John Walkenbach and David Maguiness, Excel 5 for Windows Handbook, 2nd Edition, PC World, Copyright 1994.*

Center for Chemical Process Safety of the American Institute of Chemical Engineers, "Tools for Making Acute Risk Decision with Chemical Process Safety Applications", Chapter 11, "Decision Analysis" (pp. 291-358), 1995.

Kenney, Ralph L., "Decision Analysis: An Overview", Operations Research, vol. 30, No. 5, (pp. 803-838), Sep.-Oct. 1982.

Dagnese et al., "Armstrong Evaluates a New Product Concept", *1997 Handbook of Business Strategy: A Comprehensive Resource Guide to Strategic Management: From Long-Range Planning to Tactical Business Development*, published by Faulkner & Gray.

"What is Decision Analysis", Chapter 2, pp. 13-31.

Green, "Synchronized Logistics: The 1990's Vision of Leading Personal Care Manufacturers", *Soap-Cosmetics-Chemical Specialties*, vol. 67, No. 5, p. 38, May 1991, 4 pages.

"Controlling the Cost of the Supply Chain with KAPES", *Manufacturing Systems*, vol. 15, No. 3, p. 61, Mar. 1997, 2 pages.

Olinger, "A Special Breed", *AS/400 Systems Management*, vol. 26, No. 3, pp. 62-64, Mar. 1998, 4 pages.

"Mapics: Mapics Delivers Wisdom to Midsized Manufacturers", *M2 Presswire*, Mar. 19, 1999, 2 pages.

"Perfect Launches Advanced B2B Sourcing Solution—PerfectMarket; Customers Implement PerfectMarket to Drive Evolution of Net Markets", *Business Wire*, Oct. 10, 2000, 3 pages.

"Perfect and Open Ratings Form Alliance to Provide Critical Supplier Performance Ratings to Private Exchanges and Net Markets-Leading Vendor Decision Support Tools Co-Developed by Open Ratins and Dun & Bradsheet Enable B2B . . . ", *Business Wire*, Oct. 30, 2000, 4 pages.

"Semiconbay.com Launches New Open Marketplace for the Semiconductor Industry-Introducing Hundreds of Products, from Cleanroom Supplies and Equipment and Factory Automation Products, to Research Papers and Books", *Business Wire*, Oct. 31, 2000, 2 pages.

Raleigh, "Computers are Telling Managers How to Work Better, But is Anybody Listening? The Hard Facts on Management Software", *San Jose Mercury News*, Morning Final Edition, Computing Section, p. 13F, Apr. 13, 1986, 4 pages.

McCune, "Presto! A Business Plan.", *Success*, vol. 38, No. 8, p. 59, Oct. 1991, 2 pages.

Woodward, "Analyzing and Executing Mergers and Acquisitions", *Healthcare Financial Management*, vol. 51, No. 5, pp. 62-64, May 1997, 5 pages.

Anonymous, "Leading Online E-Commerce and Entertainment Retailers Endorse Andromedia's LikeMinds Personalization Server 3.0", *Business Wire*, Jul. 15, 1999, 4 pages.

Delen, Dursun, et al., "An Integrated Toolkit for Enterprise Modeling and Analysis", *Proceedings of the 1999 Winter Simulation Conference*, Dec. 5-8, 1999, pp. 289-297.

Bhattacharjee, Sudip, et al., "Enterprise Computing Environments and Cost Assessment", *Communications of the ACH*, vol. 43, No. 10, Oct. 2000, pp. 75-82.

"Object-Oriented Programming", Wikipedia.com, Jun. 1, 2007, http://en.wikipedia.org/wiki/Object-oriented_programming (cited for illustrative purposes regarding the history and background of Object-oriented programming).

Leeflang, Peter S. H., et al., "Building Models for Marketing Decisions:; Past, Present and Future", *International Journal of Research in Marketing*, vol. 17, 2000, pp. 105-126.

Logical Decisions for Windows, logicaldecisions.com, Aug. 14, 2001, retrieved from web.archive.org, Jun. 1, 2008, pp. 1-18, http://web.archive.org/web/20010814062748/www.logicaldecisions.com/prod01.htm.

Arsham, "Probabalistic Modeling Process: Decision Analysis", University of Baltimore, Aug. 13, 2001, retrieved from web.archive.org, Jun. 1, 2008, pp. 1-32, http://web.archive.org/web/20010813161639/ubmail.ubalt.edu/~harsham/opre640a/partIX.htm.

Guttman and Maes, "Cooperative vs. Competitive Multi-Agent Negotiations in Retail Electronic Commerce", MIT Media Laboratory, 1998, pp. 135-147.

White Paper, Profit Optimization, Outcome Software, 2002, pp. 1-16.

Sornette, Didier, "Large Deviations and Portfolio Optimization", Jun. 8, 1998, available at http://arXiv.org/abs/cond-mat/9802059, 39 pages.

ProQuest Search, http://proquest.umi.com/pqdweb?RQT=532&TS=1220355615&clientId=19649, printed Sep. 2, 2008, 2 pages.

Definition of Wizard, Perdana College of Malaysia, http://www.perdanacollege.com/library/glossary.html, printed Sep. 2, 2008, 8 pages.

* cited by examiner

Figure 1: Typical Analysis w/out Portfolio Effects
(Prior Art)

Figure 2: Constraint-Type Portfolio Effect

Figure 3: Dependence-Type Portfolio Effect

Figure 4: Database Coding of Relationships

| Field Name | Field Description |
|---|---|
| Name | Name for the dependence |
| Description | Description of the dependence |
| Origin | Identifies the origin (source) business opportunities – this is a foreign key to a particular business opportunity |
| Type | Constraint or Dependence. Signifies whether the element constrains the other opportunities, or whether it is dependent on the other opportunities |
| Variable | Refers to a particular assumption or metric that is part of the business model of an opportunity. For example, "discount", "quantity", or "profit" |
| Comparison | A comparative operator, such as "less than", or "more than" |
| Value | A specific numeric value to be used in a comparison, in combination with Variable and with Comparison |
| Filter | A filter that identifies the related set of opportunities. For example, "All Opportunities", or "All Opportunities in Southeast Region" |
| Value Model | Applicable only for "Dependence" type relationships; specifies how the value of the dependent opportunity is affected by the other related opportunities. |

Figure 5: Typical Analysis w/ Portfolio Effects

Base Value: 203

Figure 6: Example Application (Most Favored Nation)

| Field Name | Field Description |
|---|---|
| Name | *"Most Favored Nation"* |
| Description | *Line of credit must not be at lower rate for any other customer* |
| Origin | *CorpCo Line of Credit* |
| Type | *"Constraint"* |
| Variable | *"Line_of_Credit_Rate"* |
| Comparison | *"Less than"* |
| Value | *"5%"* |
| Filter | *"industry = travel"* |
| Value Model | *"Line_of_Credit_Rate" = minimum ( Line_Of_Credit_Rate )* |

Figure 7: Example Application (Cost Dependence)

| Field Name | Field Description |
|---|---|
| Name | "Model XYZ Cost Economy" |
| Description | "Economy of scale for new engine XYZ" |
| Origin | "Transnational Airlines" |
| Type | "Dependence" |
| Variable | "Quantity" |
| Comparison | "greater than" |
| Value | "1" |
| Filter | "Engine = XYZ" |
| Value Model | MULTIPLY, engine_cost, 0.8 ^ ( total quantity / 100 ) |

Figure 8: Prior Art Flow Chart

BUSINESS OPPORTUNITY ANALYTICS WITH DEPENDENCE

CROSS-REFERENCE TO RELATED APPLICATIONS

This application is related to co-pending U.S. patent application Ser. No. 09/706,097, filed Nov. 3, 2000, as well as co-pending applications U.S. patent application Ser. No. 10/224,393, entitled "Dynamic Construction of Business Analytics," U.S. patent application Ser. No. 10/224,489, entitled "System and Method For Creating and Deploying Customized Web-Based Analytical Applications," U.S. patent application Ser. No. 10/224,380, entitled "Business Portfolio Analytics," and U.S. patent Ser. No. 10/224,368, entitled "Multi-Stakeholder Software Analytics," all of which were filed concurrently with the present application. Each of the above-indicated applications is incorporated by reference herein.

FIELD OF THE INVENTION

The present invention relates to a system and method that enables the use of enterprise software to analyze the economics of an opportunity, including the dependence and relationships between opportunities.

BACKGROUND OF THE INVENTION

As used herein, the term "opportunity" includes, for example, any specific business deal, product, distribution channel, customer, or other decision around which an end-user wants to perform economic evaluations. The term "portfolio effect" includes, for example, the economic relationships between opportunities, where the result of at least one opportunity is dependent on or related to one or more other opportunities.

Typically, existing systems and methods of analyzing opportunities do not account for dependencies and relationships between two or more opportunities. For example, in existing systems, the profitability of a particular customer or particular product is analyzed "in isolation" based on a static model of inputs and outputs. Similarly, risk is generally limited to a sensitivity analysis that tests the impact of various assumptions on a result (e.g. a net present value calculation). Traditionally, each of the "Assumption" variables affects only the item (e.g. product, customer) being analyzed. These, and other, drawbacks limit the effectiveness of existing opportunity analysis methods.

Figure 1:
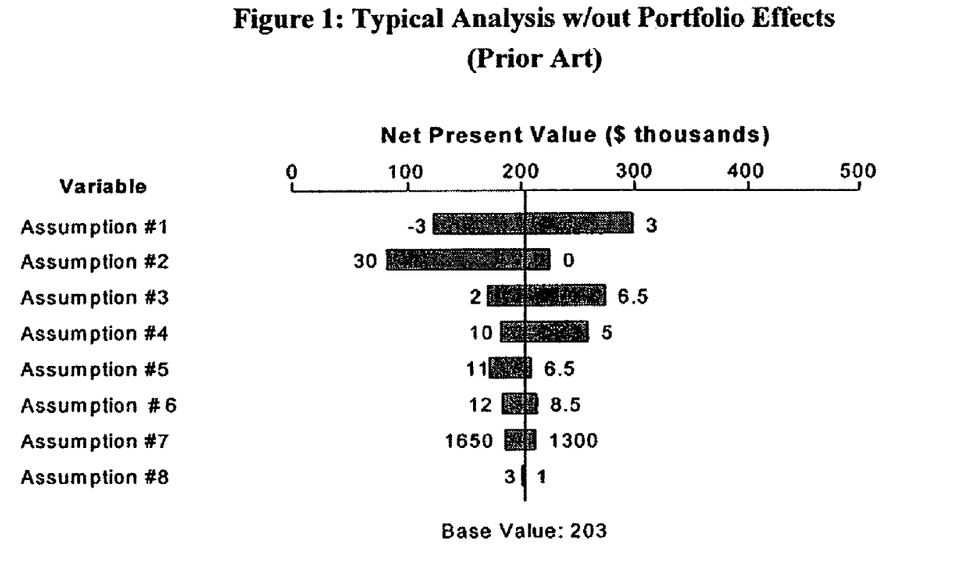
FIG. 1 is an example of a tornado chart, generated using a typical opportunity analysis method that does not account for portfolio effects.

FIG. 1 is an example of a tornado chart, generated using a typical opportunity analysis method that does not account for portfolio effects. As shown in FIG. 1, the probability of each assumption and the effect it may have on the Net Present Value (NPV) is independent of each other assumption and of other opportunities.

Another drawback of existing systems is that they do not provide generic nomenclature and procedures for describing and encoding relationships between opportunities, suitable for inclusion in and use by enterprise software. Thus, with existing systems it is not practical to evaluate on an economic basis the interrelationships between opportunities. These and other drawbacks exist.

SUMMARY OF THE INVENTION

The present invention overcomes these and other drawbacks of existing systems by enabling a system and method for using enterprise software to analyze the economics of an opportunity, including the dependence and relationships between opportunities.

According to one embodiment, the invention may comprise any suitable computer-implemented system, comprising a number of software modules that facilitate calculation of portfolio effects, where the results of one or more opportunities is dependent on or related to other opportunities. The invention may comprise modules that enable, among other things, the modeling of opportunities, including generic nomenclature and procedures for describing and encoding a wide range of relationships between opportunities, suitable for inclusion in and use by enterprise software the creation of database tables that enables the encoding of relationships, the evaluation of opportunities and the determination of portfolio effects. The database table may comprise a number of fields that facilitate the evaluation of relationships between opportunities.

Other aspects of the present invention will become apparent from the following detailed description considered in connection with the accompanying drawings that disclose embodiments of the present invention. It should be understood, however, that the drawings are designed for purposes of illustration only and not as a definition of the limits of the invention.

DETAILED DESCRIPTION OF THE INVENTION

Figure 8:
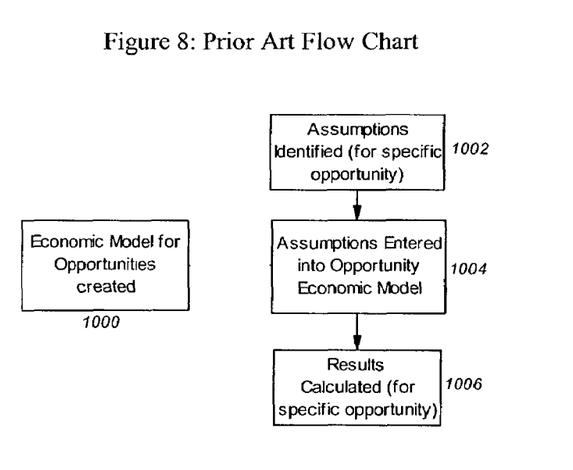
FIG. 8 is a schematic flow diagram illustrating a conventional method of evaluating an opportunity.

FIG. 8 illustrates a conventional method for evaluation of an opportunity. As shown in step 1000, a general economic model for an opportunity is created. At step 1002, specific assumptions for a specific opportunity may be developed. These assumptions are entered into the economic model (step 1004), out of which are calculated certain results (1006). In this process, each specific opportunity is evaluated entirely in isolation, on a "stand-alone" basis, and the economic evaluation process does not capture any interrelationships between opportunities.

Figure 9:
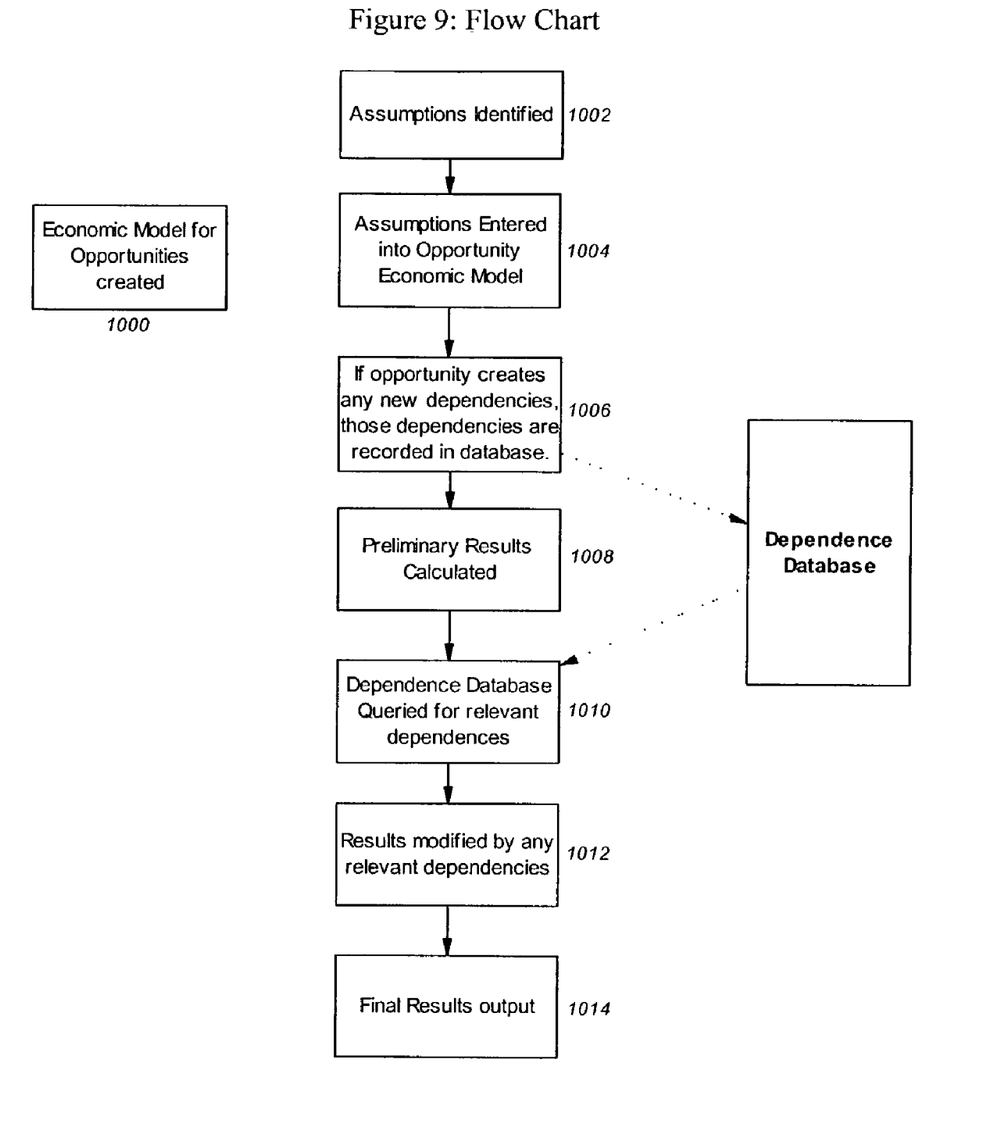
FIG. 9 is a schematic flow diagram illustrating one method for evaluating portfolio effects in the context of an opportunity evaluation.

FIG. 9 is a schematic flow diagram illustrating a method for evaluating portfolio effects according to one embodiment of the invention. As shown in FIG. 9, the process may include, as indicated at step 1000, modeling an opportunity. Modeling of an opportunity may be done in any known manner, except that according to the invention the modeling takes into account the dependence between opportunities, as detailed below. As indicated at 1002, specific assumptions for a specific opportunity may be developed, and entered into the economic model (step 1004). At step 1006, any assumptions that trigger the creation of a new "dependence" are recorded in a database of dependencies. The economic model of the opportunity includes any calculations required to identify the new dependency. Preliminary results, that exclude portfolio effects, are then calculated at step 1008. At step 1010, the dependence database is queried—searched for any dependencies that impact the particular opportunity being evaluated. If any relevant dependencies are found, the information in the dependence database is used to modify the economic results of the opportunity (step 1012), allowing for a final set of economic results to be output that includes portfolio effects (step 1014).

Figure 2:
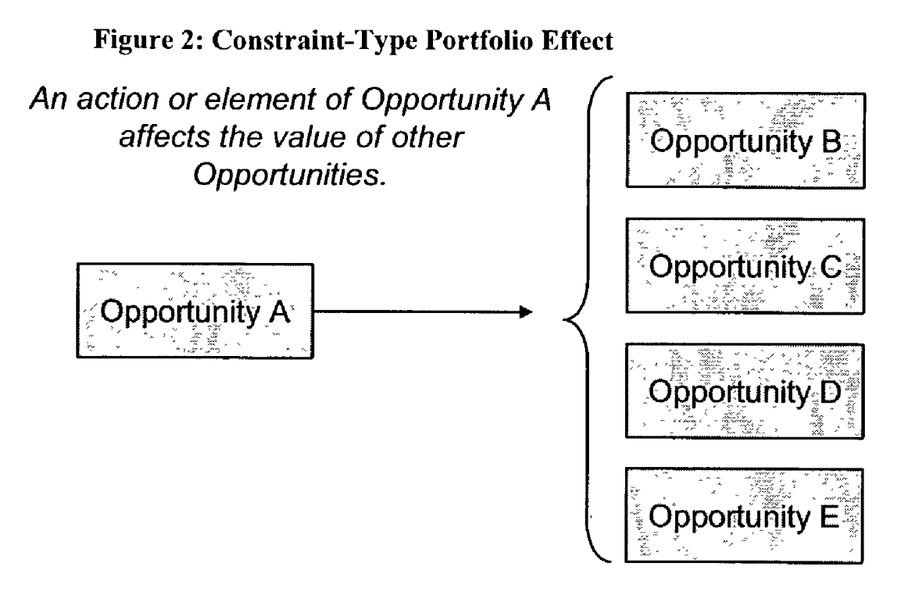
FIG. 2 is a schematic representation of a constraint-type portfolio effect according to one embodiment of the invention.
Figure 3:
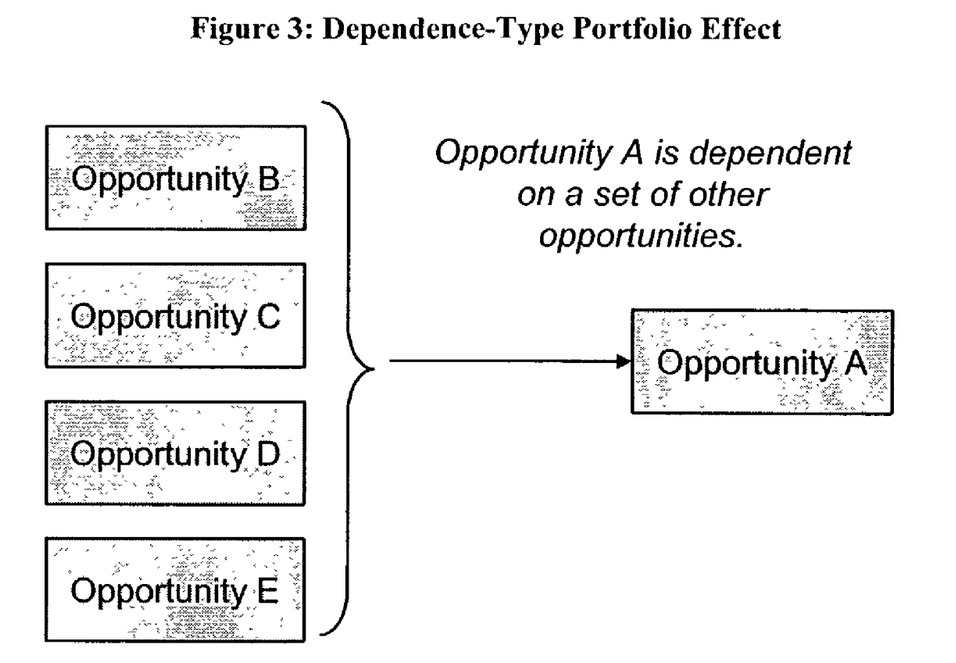
FIG. 3 is a schematic representation of a dependence-type portfolio effect according to one embodiment of the invention.

According to one aspect of the invention, portfolio effects may be classified into at least two categories. For example, portfolio effects may be categorized as constraint-type portfolio effects or as dependence-type portfolio effects. If an opportunity is a constraint, an element or action of that opportunity affects (e.g. imposes, or creates, an impact on) the value of a set of one or more other opportunities. This type of effect is show schematically in FIG. 2. As shown in FIG. 2, an action or element of Opportunity A affects the value of Opportunities B-E. If an opportunity has a dependence, then that particular opportunity depends in some way on a set of other opportunities. The causality is reversed from the constraint-type effect. A dependence-type relationship is illustrated in FIG. 3, wherein the Opportunity A depends upon an element of one or more of Opportunities B-E.

An example of a constraint is a "Most Favored Nation" term in a business contract (or other) relationship. A Most Favored Nation term may be, for example, a contract term in an agreement with Customer A that imposes a constraint on contracts with all other Customers, namely that no customer will be offered a more favorable term than Customer A. Customer A has in effect imposed a constraint that affects the value of other Customer agreements.

One example of a dependency is where a project (e.g., Opportunity A) depends upon the successful completion of other projects (e.g., Opportunities B, C, D and E). Other dependency relationships are also possible.

Figure 4:
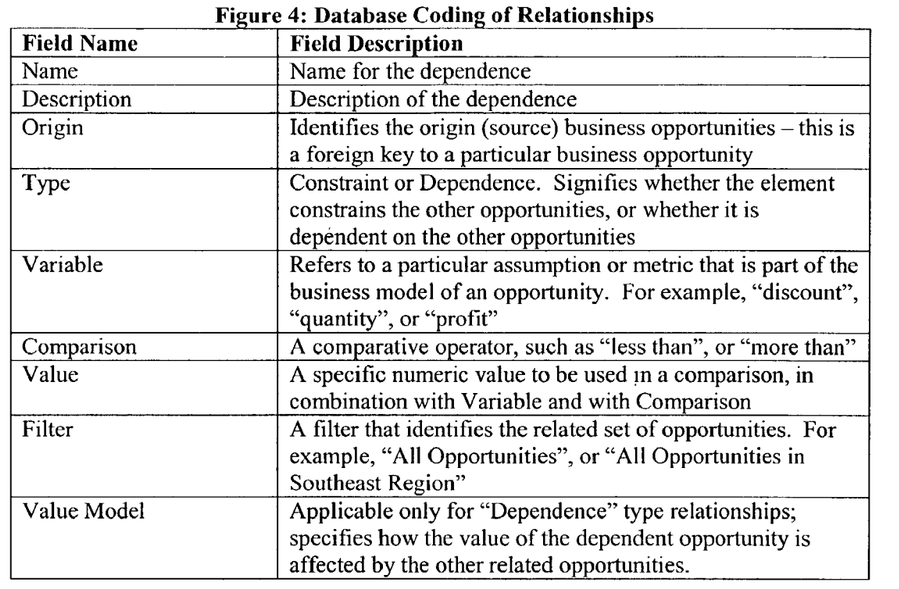
FIG. 4 is an example of database table coding relationships according to one embodiment of the invention.

According to one embodiment of the invention, portfolio effects may be generalized and coded through use of one or more database tables. For example, a database table may be used to define certain elements of each portfolio effect. FIG. 4 is an illustration of a database table according to one embodiment of the invention. As shown in FIG. 4, a database table may comprise a number of fields that pertain to elements of the dependence or relationship between two or more opportunities. For example, a database table may comprise the following fields: name, description, origin, type, variable, comparison, value, filter and value model. Of course, other fields are possible and not all these fields need to be used. The Description field may represent a description of a dependence. An Origin field may identify the origin (source) of a business opportunities—this is a pointer to a particular business opportunity. The Type field may identity whether the dependence is a constraint or dependence type. This can signify whether the element constrains other opportunities, or whether it is dependent on other opportunities. The Variable field refers to a particular assumption or metric that is part of the business model of an opportunity. For example, some variables include "discount", "quantity", "profit", etc. The Comparison field may include a comparative operator, such as "less than", or "more than", etc. The Value field may include a specific numeric value to be used in a comparison, in combination with the value of the Variable field and the operator of the Comparison field. The Filter field may identify a related set of opportunities. For example, "All Opportunities", or "All Opportunities in Southeast Region". The Value Model field is applicable for "Dependence" type relationships and specifies how the value of the dependent opportunity is affected by the other related opportunities.

When an opportunity is created and evaluated (FIG. 9: Step 1006), any new dependencies that are being created are first identified. For example, an opportunity model might have an input assumption labeled "Pre-Requisite Opportunities?", and if the user selects "Yes" they are then asked to select some other opportunity that is the pre-requisite. In this situation, a new dependence is being defined, and that dependence is recorded as a record in the dependence database. If the user selected "No", then no dependence is being created and evaluation can proceed as normal.

Later during the evaluation process (FIG. 9: Step 1010), a search of the dependence database is conducted. The search checks for all records where the current opportunity is the "Origin"—in other words, all dependencies that are relevant to the current evaluation. Based on the information returned from the dependence database, the evaluation results for the opportunity are modified to include the portfolio effects.

Figure 5:
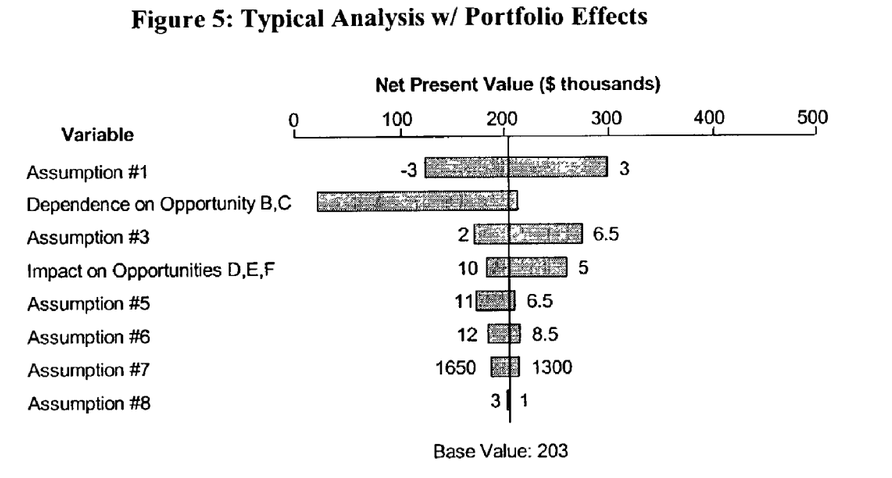
FIG. 5 is a tornado chart illustrating opportunity analysis with portfolio effects according to one embodiment of the invention.

By including portfolio effects using the described protocol, the economic analysis can include and display the impact of related opportunities, as illustrated in FIG. 5. For example, using a tornado chart analysis, one or more of the elements may comprise dependences or relationships.

Several features of the invention may be illustrated with reference to the following examples. In the first example, a bank is considering signing an agreement with a corporate customer (TravelCo.) in the travel industry for a line of credit. One term of the agreement is a so-called "Most Favored Nation" clause, that specifies that the bank cannot offer this same line of credit product to any other customer, in the same industry, at a lower rate than this particular customer is receiving (e.g. 5%). If the bank does, then that lower rate will apply to TravelCo also. The interest rate on the line of credit is referred to as "line_of_credit_rate" in the analytic models.

Figure 6:
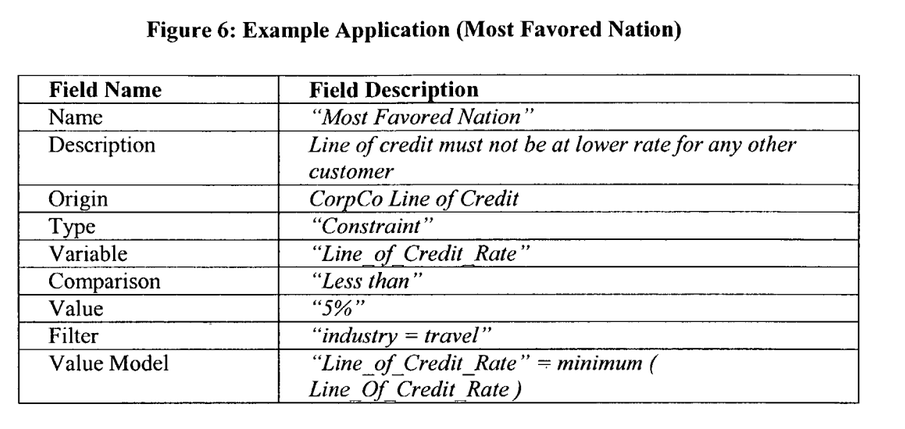
FIG. 6 is an example of a database table illustrating a most favored nation constraint according to one embodiment of the invention.

At FIG. 9, Step 1006, the fact that the agreement contains a so-called Most Favored Nation clause triggers the recording of a new dependence in the dependence database. The details of this database record are shown in FIG. 6. With reference to FIG. 6, the name and description are recorded to represent the type of dependency (these are specified as part of Step 1000, modeling the opportunity). The Origin field simply points to the current opportunity being evaluated. The Type, Variable, Comparison, Value, Filter, and Value Model are also recorded on the basis of the specific terms of the current opportunity being evaluated. In this example, the agreement specifies that no other customer in the travel industry shall have a line of credit interest rate lower than 5%.

Later during the evaluation process, (FIG. 9, Step 1010), the dependence database is queried for any records where the "Origin" field is the current opportunity. As a result, the record (shown in FIG. 6) is identified. Based on this information, at FIG. 9, Step 1010, the following sequence occurs: First, all other agreement with corporate customers in the travel industry are identified (based on the "Filter" field), and of these, any with an interest rate on a line of credit of less than 5% are identified (based on "Variable", "Comparison", and "Value" fields). Of agreements that do have an interest rate less than the 5% threshold, the system identifies the minimum of all of the interest rates and applies that minimum to TravelCo's evaluation (based on "Value Model" field).

In the second example, a company is evaluating a potential sale of a new class of jet engines to an airline (TransNational). Because the class of engines is quite new, the cost of the engines is highly dependent on the volume of other orders received from other airlines. If more other orders exist, the costs for the engines will be substantially lower. Manufacturing estimates that costs will be reduced 20% for each 100 engines ordered.

Figure 7:
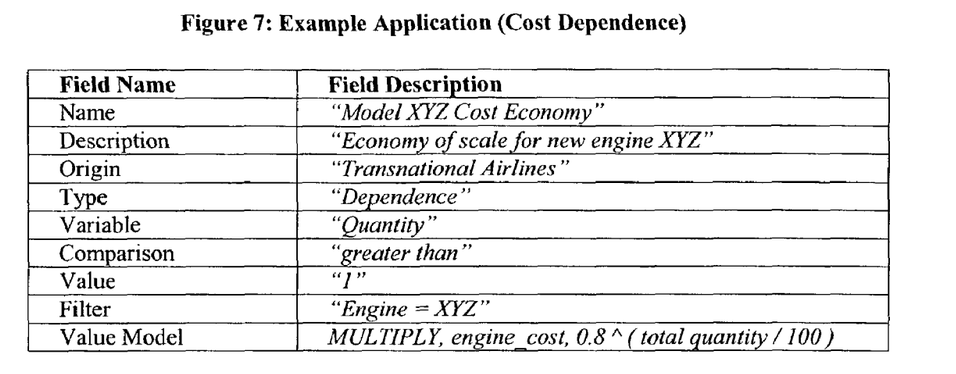
FIG. 7 is an example of a database table illustrating a cost dependence portfolio effect according to one embodiment of the invention.

In this example, the database record shown in FIG. 7 is recorded when the opportunity is being evaluated (FIG. 9, Step 1006). Later (FIG. 9, Step 1010), this record is identified as being relevant (based on the "Origin" field). At FIG. 9, Step 1012, all other sales of engine XYZ are identified (based on the "Filter" fields). Of these sales, any with a quantity greater than 1 are identified (in this case, that will be all of the sales of engine XYZ). The field "Variable" in this case identifies the variable of interest for the other sales of engine XYZ. The field "Value Model" then specifies that an addition term should be MULTIPLIED to the engine_cost variable, and that the multiplier should be calculated as $0.8^{\wedge}Q/100$ where Q is total quantity of the other sales.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A computer implemented system for analyzing metrics associated with an opportunity, including any portfolio effects due to the results of one or more of opportunities being dependent on or related to other opportunities, the system comprising:
   one or more processors executing a plurality of modules, the modules comprising:
      a modeling module that provides models of two or more opportunities, wherein a model of a given opportunity enables a determination of one or more metrics representing the value of the given opportunity as a function of one or more variables that impact the value of the opportunity; and
      a dependency module that obtains information related to dependencies between two or more of the opportunities, wherein a dependency is a restriction placed on a variable of a model of a first one of the two or more opportunities that depends on either (i) a variable of a model of a second one of the two or more opportunities, or (ii) a metric representing the value of the second one of the two or more opportunities determined from the model of the second one of the two or more opportunities; and
      an electronically readable storage medium providing storage for a database that stores information obtained by the dependency module related to the dependencies between the opportunities, wherein the information stored in the database for a given dependency includes an identification of a variable of a model of one of the two or more opportunities that is restricted by the given dependency;
   wherein the one or more processors further execute a calculation engine that implements a model provided by the modeling module to determine metrics representing the value of a given opportunity, wherein the metrics reflect one or more dependencies between the given opportunity and other ones of the opportunities.

2. The system of claim 1, wherein at least one model of one or more opportunities comprises a variable having an uncertainty and a dependency, and wherein the dependency of the variable dictates that the uncertainty of the variable is either a function of a variable of another model of another opportunity or a function of a metric representing the value of the other opportunity.

3. The system of claim 2, wherein any assumptions that trigger the creation of a new dependency are recorded in the database.

4. The system of claim 1, wherein the calculation engine first implements the model provided by the modeling module to calculate preliminary metrics that do not reflect dependencies between the given opportunity and other ones of the opportunities, queries the database for any dependencies between the given opportunity and other ones of the opportunities, and, if any relevant dependencies are found, implements information related to the found relevant dependencies that is stored in the database to modify the preliminary metrics to provide a final output that includes the metrics representing the value of the given opportunity and reflects the found relevant dependencies.

5. The system of claim 1, wherein the dependencies for which the dependency module obtains information include constraint-type dependencies, wherein a constraint-type dependency exists where the variable of the model of the first one of the two or more opportunities is constrained to a range of possible values that is defined in part based on either a variable of the model of the second one of the two or more opportunities, or a metric representing the value of the second one of the two or more opportunities determined from the model of the second one of the two or more opportunities.

6. The system of claim 1, wherein the database comprises a number of fields that pertain to elements of dependencies between the opportunities, including one or more of a name, a description origin, a type, a comparison, a filter, or a value model field.

7. The system of claim 1, wherein the dependencies for which the dependency module obtains information include dependence-type dependencies, wherein a dependence-type dependency exists where the variable of the model of the first one of the two or more opportunities is equal to either a variable of the model of the second one of the two or more opportunities, or a metric representing the value of the second one of the two or more opportunities determined from the model of the second one of the two or more opportunities.

8. A computer implemented method for analyzing metrics associated with an opportunity, including any portfolio effects due to the results of one or more of opportunities being dependent on or related to other opportunities, the method comprising:
   modeling by a computer opportunities to provide models of the opportunities, wherein a model of a given opportunity enables a determination of one or more metrics representing the value of the given opportunity as a function of one or more variables that impact the value of the opportunity;

obtaining information related to dependencies between two or more of the opportunities, wherein a dependency is a restriction placed on a variable of a model of a first one of the two or more opportunities that depends on either (i) a variable of a model of a second one of the two or more opportunities, or (ii) a metric representing the value of the second one of the two or more opportunities;

storing the obtained information related to dependencies between the opportunities to a database, wherein the information stored in the database for a given dependency includes an identification of a variable of a model one of the two or more opportunities that is restricted by the given dependency;

implementing a model of a given opportunity to calculate metrics representing the value of the given opportunity, wherein the metrics reflect one or more dependencies between the given opportunity and other ones of the opportunities; and storing the calculated metrics.

9. The method of claim 8, wherein at least one model of the opportunities some comprises a variable having an uncertainty and a dependency, and wherein the dependency of the variable dictates that the uncertainty of the variable is a function of either a variable of another model of another opportunity or a function of a metric representing the value of the other opportunity.

10. The method of claim 9, wherein any assumptions that trigger the creation of a new dependency are stored with the obtained information related to dependencies.

11. The method of claim 8, wherein implementing the model of the given opportunity to calculate the metrics comprises:

implementing the model to calculate preliminary metrics that do not reflect dependencies between the given opportunity and other ones of the opportunities;

querying the database for any dependencies between the given opportunity and other ones of the opportunities; and if any relevant dependencies are found, implementing stored information in the database related to the found relevant dependencies to modify the preliminary metrics to provide a final output that includes the metrics representing the value of the given opportunity that reflect the found dependencies.

12. The method of claim 8, wherein the dependencies for which the dependency module obtains information include constraint-type dependencies, wherein a constraint-type dependency exists where the variable of the model of the first one of the two or more opportunities is constrained to a range of possible values that is defined in part based on either a variable of the model of the second one of the two or more opportunities, or a metric representing the value of the second one of the two or more opportunities determined from the model of the second one of the two or more opportunities.

13. A processor readable medium for analyzing metrics associated with an opportunity, including any portfolio effects due to the results of one or more of opportunities being dependent on or related to other opportunities, the processor readable medium comprising:

a first processor readable program code for modeling opportunities to provide models of the opportunities, wherein a model of a given opportunity enables a determination of one or more metrics representing the value of the given opportunity as a function of one or more variables that impact the value of the given opportunity;

a second processor readable program code for obtaining information related to dependencies between two or more of the opportunities, wherein a dependency is a restriction placed on a variable of a model of a first one of the two or more opportunities that depends on either (i) a variable of a model of a second one of the two or more opportunities, or (ii) a metric representing the value of the second one of the two or more opportunities determined from the model of the second one of the two or more opportunities;

a third processor readable program code for storing the obtained information related to dependencies between the opportunities to a database, wherein the information stored in the database for a given dependency includes an identification of a variable of a model of one of the two or more opportunities that is restricted by the given dependency; and a fourth processor readable program code for implementing a model of a given opportunity provided by the first processor readable program code to calculate metrics representing the value of the given opportunity, wherein the metrics reflect one or more dependencies between the given opportunity and other ones of the opportunities.

14. The processor readable medium of claim 13, wherein at least one model of an opportunity comprises a variable having an uncertainty and a dependency, and wherein the dependency of the variable dictates that the uncertainty of the variable is either a function of a variable of another model of another opportunity or a function of a metric representing the value of the other opportunity.

15. The processor readable medium of claim 14, wherein any assumptions that trigger the creation of a new dependency are stored with the obtained information related to.

16. The processor readable medium of claim 13, wherein fourth processor readable program code comprises:

code for implementing the model of the given opportunity to calculate preliminary metrics that do not reflect dependencies between the given opportunity and other ones of the opportunities;

code for querying the database for any dependencies between the given opportunity and other ones of the opportunities; and code implementing stored information from the database related to found dependencies to modify the preliminary metrics to provide a final output that includes the metrics representing the value of the given opportunity that reflect the found dependencies, if any dependencies are found.

17. The processor readable medium of claim 13, wherein the dependencies between the given opportunity and the other ones of the opportunities for which information is obtained comprise constraint-type dependencies, wherein a constraint-type dependency exists where the variable of the model of the first one of the two or more opportunities is constrained to a range of possible values that is defined in part based on either a variable of the model of the second one of the two or more opportunities, or a metric representing the value of the second one of the two or more opportunities determined from the model of the second one of the two or more opportunities.

* * * * *